Oct. 24, 1961  W. HAHN ET AL  3,005,390
EXPOSURE CONTROL APPARATUS
Filed Dec. 28, 1959  2 Sheets-Sheet 1

Inventors
WERNER HAHN
JOHANNES WEISE
EDITH BERGER
By Irwin S. Thompson
Attorney

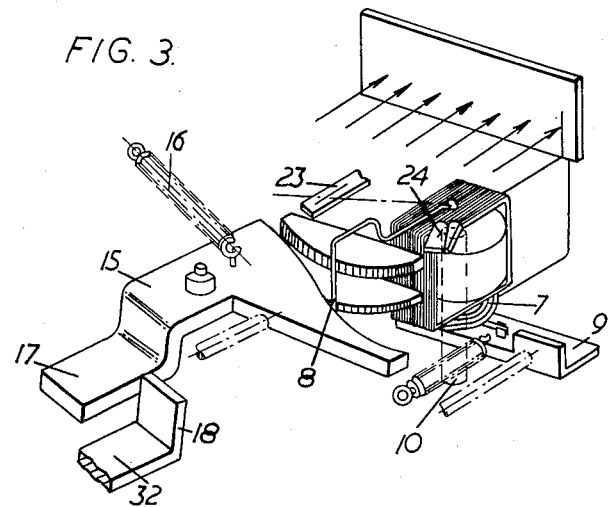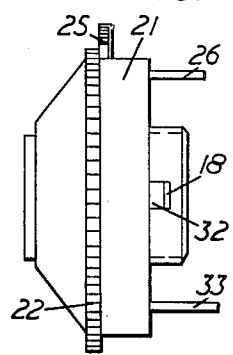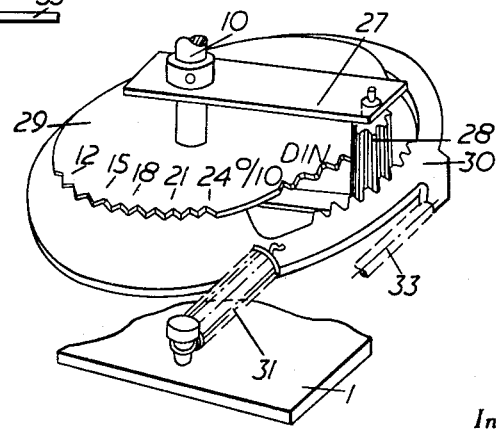

United States Patent Office

3,005,390
Patented Oct. 24, 1961

3,005,390
EXPOSURE CONTROL APPARATUS
Werner Hahn, Johannes Weise, and Edith Berger, all of Dresden, Germany, assignors to VEB Kamera- und Kinowerke Dresden, Dresden, Germany
Filed Dec. 28, 1959, Ser. No. 862,320
5 Claims. (Cl. 95—10)

The present invention relates to an exposure control arrangement for photographic apparatus, which converts the brightness values which are fed to its photo-electric cell into setting values.

The said setting values, as is known, are fed especially mechanically to the setting members for the exposure factors to be controlled, so that these setting members receive the position necessary at the time of the exposure in view of these values.

In accordance with the invention an exposure control arrangement consists essentially of a photo-electric measuring instrument, the pointer of which moves in relation to a stop cam, a setting lever secured by a retaining lever, the spring of which seeks to press the said setting lever of the pointer against the stop cam, and a guide lever coupled with the measuring instrument as a whole or at least a part of the measuring instrument, which serves to take into consideration exposure factors which naturally have to be set before every exposure. The guide lever is expediently subject to the action of a return spring. As a result of a special embodiment the guide lever can also be coupled with a differential gear, that is to say can be constructed for example as the cage of a differential gear, so that a plurality of exposure factors can be taken into consideration. Furthermore, the guide and control levers of the exposure control arrangement are preferably accessible through sockets provided in the housing. The setting lever, subject to spring action, may be coupled with the shutter-cocking lever or another lever which is moved during the running-off of the shutter.

A constructional form of the invention is illustrated by way of example in the accompanying diagrammatic drawing wherein:

FIGURE 3 is a similar perspective view showing the mechanism in the ready position;

FIGURE 4 is a perspective view showing the special construction of the guide lever; and FIGURE 5 is a plan view of a between-the-lens shutter.

Figure 2:
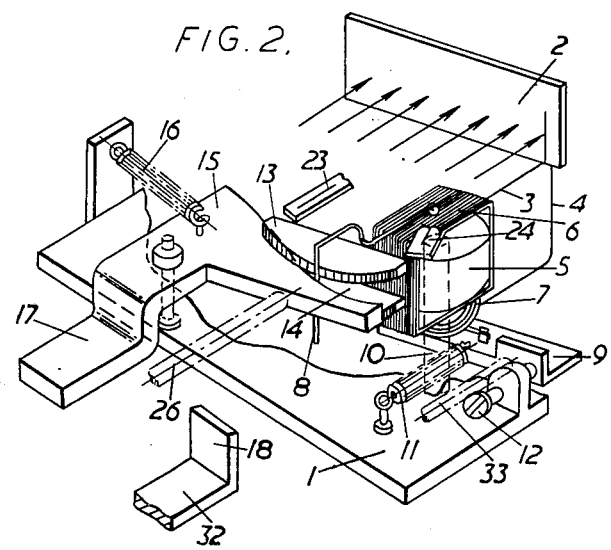
FIGURE 2 is a perspective view thereof showing the mechanism in the measuring position.

In a housing 1 there is secured a photo-electric cell 2 (FIGURE 2), which is connected through electric leads 3 and 4 with a winding 6. A moving coil 5 is mounted on a shaft 10 and carries a pointer 8. One end of a return spring 7 is connected to the coil 5 while its other end is secured on a guide lever 9. The guide lever 9 is subject to the action of a return spring 11, which urges the guide lever against an adjustment screw 12.

The pointer 8 moves in an intermediate space which is formed by a setting lever 15, subject to the action of a traction spring 16, and a pair of cams 13 and 14. An arm 17 of the setting lever 15, after installation in a camera lies in the path of a lug 18 of a shutter-cocking lever 32 (FIGURE 5), which is moved in one direction during the cocking of the shutter and in the opposite direction after the release of the shutter.

The manner of operation of the device is as follows:

On the cocking of the shutter 21 (FIGURE 5), the cocking lever 32 (FIGURE 3) of the shutter is moved, so that the bent-out lug 18 strikes against the arm 17 of the setting lever 15 and pivots against the action of the spring 16. The pointer 8 is then released, so that it can set itself according to the existing light conditions. Through the guide push-rod 33 displaceable in the axial direction by the time-setting ring 22 (FIGURE 5) by way of suitable transmission means (not shown) the guide lever 9 (FIGURE 3) is rotated and thus a variation of initial tension of the return spring 7 is brought about. Consequently the pointer 8 changes its position according to the set exposure time. The pointer 8 serves as a stop for the setting lever 15, which is coupled to the diaphragm. According to the position of the pointer 8, the setting lever 15 can be rotated to a greater or lesser extent under the action of the spring 16 and thereby correspondingly open or close the diaphragm to a greater or lesser extent. This variation of the spring 7 must be influenced by the time-setting ring 22 until the pointer 8 is situated in a manner known per se between two fired tolerance marks 23 and 24 on the camera housing. The indexes 23 and 24 show the photographer whether a correctly exposed exposure is or is not possible with the camera as set at that moment. For example, if the pointer is between the two indexes 23 and 24, a correctly exposed exposure can be expected. Then the camera is ready for taking a picture.

Figure 1:
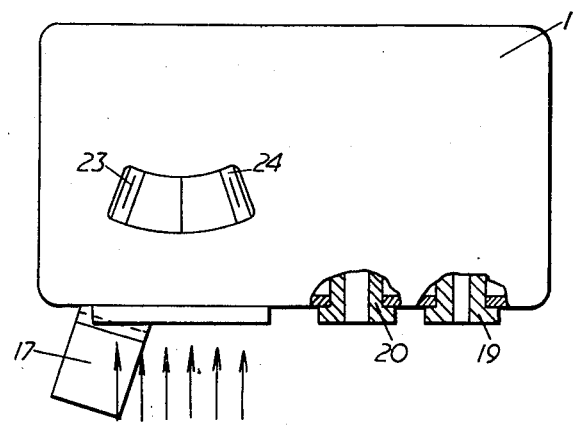
FIGURE 1 is a plan view of an exposure control device made in accordance with the invention.

By actuation of the release lever 25 the shutter-cocking lever 32 (FIGURE 5) is released for running off so that the lug 18 departs from the arm 17 of the setting lever 15 (FIGURE 1). The spring 16 thereupon rotates the setting lever 15 whereby the pointer 8 is clamped fast between the setting lever 15 and the stop cams 13 and 14. The setting push-rod 26 which is connected with the spring-loaded diaphragm ring (not shown) of the shutter 21, follows the movement of the setting-lever 15. This push-rod 26 accordingly automatically sets the diaphragm directly after the commencement of the running off of the shutter, to the value ascertained by the exposure control arrangement.

In order to ensure satisfactory co-operation of the push-rod 33 and 26 on the one hand and the levers 9 and 15 on the other hand, guide sockets 19 and 20 are provided in the housing 1, in which the push-rods 33 and 26 slide (FIGURE 1).

In order that further exposure factors such for example as film sensitivity or filter factors, may also be taken into consideration, in accordance with a modified construction (FIGURE 4) a cross-piece or cage 27, acting as guide lever, of a differential gearing 28, 29, 30, is connected with the shaft 10. A pinion 28 mounted on this cross-piece 27 meshes on the one hand with the setting disc 29 for the film sensitivities and on the other hand with a toothed ring 30. The ring 30, provided with the return spring 31, is again connected with a guide push-rod 33.

We claim:

1. In a photographic camera including a housing, a shutter device, a first exposure factor setting means in the shutter device, a second exposure factor setting means in the shutter device, and a shutter cocking ring having a cocking lever extending therefrom; the provision of a photo-electric cell, a moving coil electrically connected to said cell, a pointer attached to the moving coil, a movable guide lever mounted in the housing, a return spring connected between said moving coil and said guide lever, a first movable element in engagement with said guide lever for setting the position of the latter and connected with said first exposure factor setting means so as to be settable thereby, a cam element mounted in the housing, a setting lever pivotally mounted in the housing, a spring connected between the setting lever and a fixed point in the housing, said setting lever having one part thereof provided with a cam profile which is positioned adjacent said cam element and another part thereof lying in the path of the cocking lever by which the setting lever is movable into a first position against the force of its spring whereby the pointer moves freely in the space provided between the cam element and the cam profile of the setting lever and into a second position determined by the position of the pointer whereby the pointer is clamped between the cam element and the cam profile of the setting lever under the influence of the spring, and a second movable element which is in engagement with said setting lever so as to be settable thereby and which is connected with said second exposure factor setting means.

2. In a photographic camera including a housing, a shutter device, an adjustable aperture diaphragm in the shutter device, exposure factor setting means, and a shutter cocking ring having a cocking lever extending therefrom; the provision of a photoelectric cell, a moving coil electrically connected to said cell a pointer attached to the moving coil, a movable guide lever mounted in the housing, a return spring connected between said moving coil and said guide lever, a first movable element in engagement with said guide lever for setting the position of the latter and connected with said first exposure factor setting means so as to be settable thereby, a cam element mounted in the housing, a setting lever pivotally mounted in the housing, a spring connected between the setting lever and a fixed point in the housing, said setting lever having one part thereof provided with a cam profile which is positioned adjacent said cam element and another part thereof lying in the path of the cocking lever by which the setting lever is movable into a first position against the force of its spring whereby the pointer moves freely in the space provided between the cam element and the cam profile of the setting lever and into a second position determined by the position of the pointer whereby the pointer is clamped between the cam element and the cam profile of the setting lever under the influence of the spring, and a second movable element which is in engagement with said setting lever so as to be settable thereby and which is connected with the aperture diaphragm.

3. A photographic camera according to claim 2, wherein a zero adjustment stop is provided on the housing for the guide lever, and a further spring is provided between said guide lever and a fixed point on the housing for urging said guide lever against the zero adjustment stop.

4. A photographic camera according to claim 2, wherein the guide lever is in the form of a cage of a differential gearing.

5. A photographic camera according to claim 2, wherein sockets are provided in the housing which serves as guides for said first and second movable elements.

References Cited in the file of this patent

UNITED STATES PATENTS 2,887,026  Rentschler _____ May 19, 1959

FOREIGN PATENTS 756,282  Germany _____ Feb. 23, 1953